United States Patent [19]

Tate et al.

[11] 4,020,359

[45] Apr. 26, 1977

[54] ELECTRICAL CONTROL SYSTEM

[75] Inventors: Walter Tate, High Wycombe; Thomas Robertson, Darlington, both of England

[73] Assignees: Davy Powergas Limited; Rotraco Systems Limited, both of England

[22] Filed: Mar. 24, 1975

[21] Appl. No.: 561,432

[52] U.S. Cl. .................................. 307/40; 318/562; 340/147 PC

[51] Int. Cl.² .......................................... G05B 11/42

[58] Field of Search .............. 307/10 R, 38, 39, 40, 307/41; 340/172, 147 PC, 310 R, 310 A, 164 R, 311; 318/562

[56] References Cited

UNITED STATES PATENTS

| | | | |
|---|---|---|---|
| 2,869,110 | 1/1959 | Wagner | 340/172 |
| 2,912,684 | 11/1959 | Steele | 340/172 X |
| 2,946,043 | 7/1960 | Reenstra et al. | 340/147 PC |
| 3,821,559 | 6/1974 | Ueda | 307/10 R |

*Primary Examiner*—Robert K. Schaefer
*Assistant Examiner*—Morris Ginsburg
*Attorney, Agent, or Firm*—Morton, Bernard, Brown, Roberts & Sutherland

[57] ABSTRACT

An electrical control system for controlling a plurality of electrical loads comprises an electrical drive unit capable of providing a plurality of separate electrical signals each at a different reference level and a fixed frequency coded electrical interrogator signal, and for each electrical load there is provided a switching unit arranged to receive the signals from the drive unit and arranged to be connected via a control link for a different part of the interrogator signal to a contactor control unit and during that part of the interrogator signal a control signal representative of the condition of the switching unit is supplied to the contactor control unit. The contactor control units are connected to respective contactors in the supply circuits of separate electrical loads and the contactor control units serve to control the operation of the contactors in response to the signals received from the associated switching units.

11 Claims, 3 Drawing Figures

ELECTRICAL CONTROL SYSTEM

Figure 1:
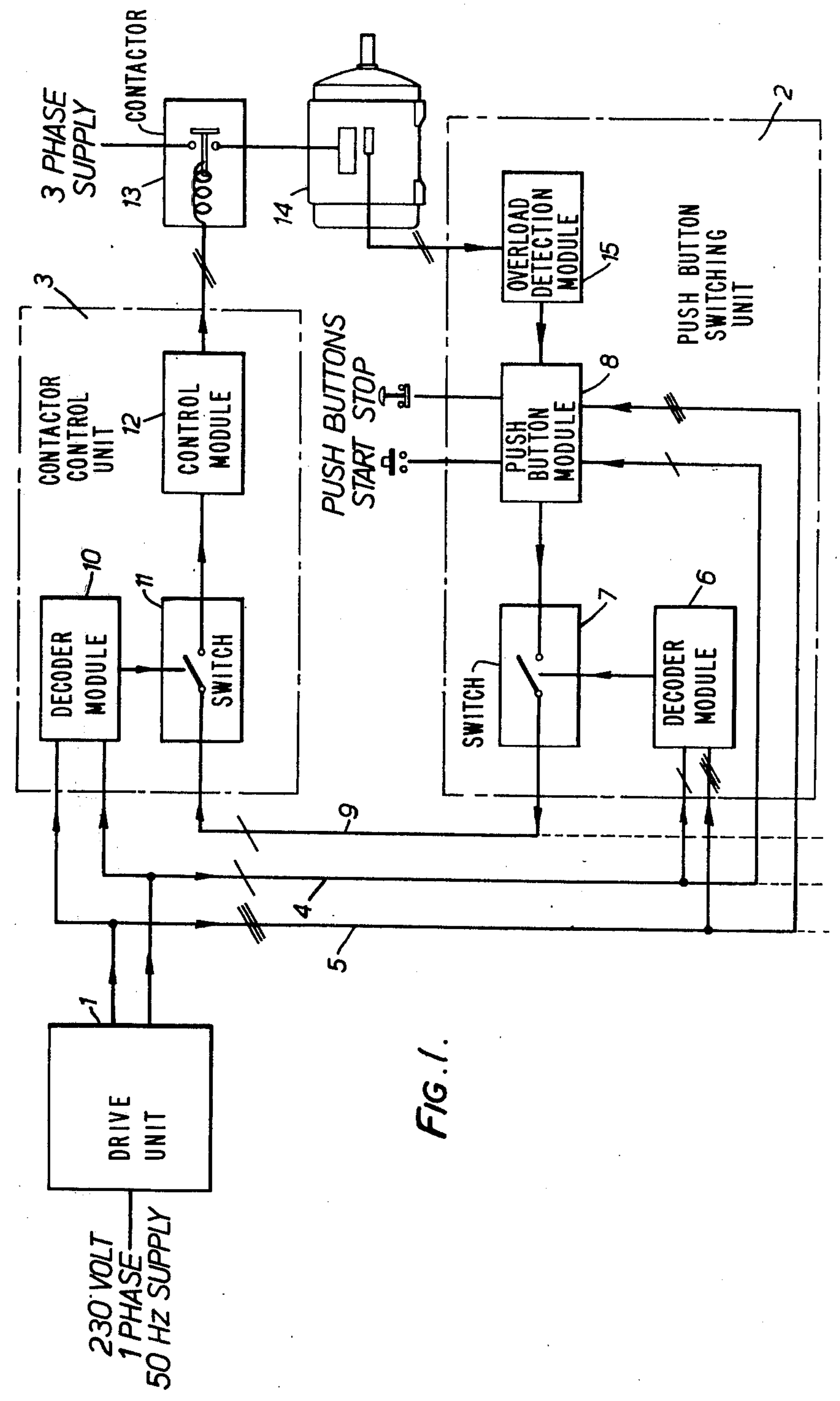

This invention relates to an electrical control system for controlling a plurality of electrical loads.

Many industrial installations have electrical loads such as motors, actuators, thrustors and solenoid valves supplied from a common starter or contactor board but controlled from a push-button unit positioned adjacent to the load. This necessitates control cables being run from each push-button unit back to the starter board, which, if the distance between the starter board and loads exceed 50 metres or so, can comprise an appreciable proportion of the cost of materials and installation.

It is an object of the present invention to provide an electrical control system suitable for controlling a plurality of electrical loads in such an installation and where the amount of control cabling required is reduced over conventional arrangements.

According to the present invention an electrical control system comprises an electrical drive unit capable of providing a plurality of separate electrical signals each at a different reference level and a fixed frequency coded electrical interrogator signal, a plurality of switching units arranged to receive the signals from said drive unit and each arranged to be connected via a control link for a different part of the interrogator signal to a separate one of a plurality of contactor control units, during which part of the interrogator signal a control signal representative of the condition of the switching unit is supplied to the contactor control unit, said contactor control units serving to control the operation of contactors in the supply circuits of separate electrical loads in response to the signals received from the associated switching units.

All the separate switching units are controlled by one drive unit with each switching unit being connected to the control link for a separate part of each cycle of the interrogator signal. For example if the interrogator signal is coded in eight "bits" during each cycle, then eight separate switching units are connectable in turn to the control link, with each switching unit connected to the control link during the period of one "bit" of each cycle of the interrogator signal.

During the time interval when a switching unit is connected to the control link the contactor control unit associated with the switching unit is also connected to the link and all the other switching units and their associated contactor control units are disconnected from the link. Consequently only one control link, which may take the form of a single core of a multi-core cable, is required for the plurality of, for example eight, separate electrical loads.

Further separate control links may be provided with each link connectable to say eight separate electrical loads. Consequently an electrical cable having three cores, one for each of three reference levels from the drive unit, a separate core for the interrogator signal and a separate core for the control link, giving a total of five cores is required to connect the control circuits for eight separate electrical loads. If a further core, constituting a further control link is provided, making six cores in all, then 16 separate electrical loads can be controlled. If 13 control links, making a total of 17 cores of the cable are employed, then 104 separate loads can be controlled.

Figure 2:
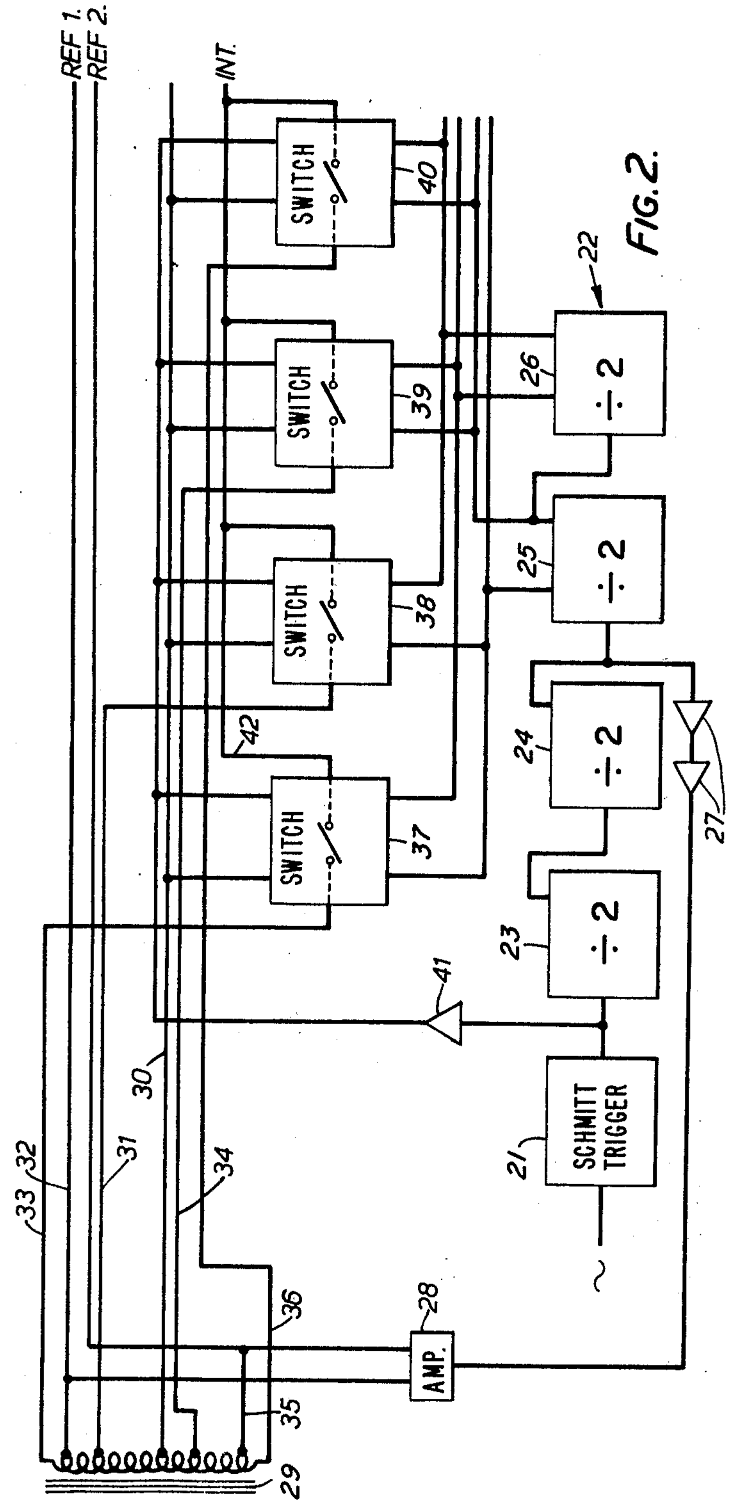

In order that the invention may be more readily understood it will now be described, by way of example only, with reference to the accompanying drawings in which FIG. 1 is a circuit diagram illustrating one embodiment of the invention, FIG. 2 is a block diagram of the drive unit 1, and FIG. 3 indicates the wave form of the interrogator signal.

FIG. 1 illustrates the operation of the system for one load only and indicates which parts of the system and cabling are common to other loads.

The system comprises essentially three units, a drive unit 1, a push-button switching unit 2 for each load and a contactor control unit 3 for each load.

The drive unit is arranged to form a self contained chassis or box which may be mounted inside a compartment of a multi load control panel, the unit requiring only a single phase A.C. supply at mains frequency to energise it. The output is taken from four terminals requiring no special screening facilities.

The unit produces simultaneously three signals having the following reference levels:

a. A square wave of ¼ supply frequency
b. The complement of (a) above
c. Zero reference level and an interrogator signal which is basically a fixed frequency stepped square wave making an 8 bit code and having a periodic time of 320 milliseconds. The interrogator signal and reference level signals are fed out from the drive unit on four cores 4 and 5 respectively of a control cable which are common to all parts of the system.

The push-button unit 2 receives the interrogator signal and the three signals of different reference levels and feeds them into a decoder module 6 whose circuit has been keyed to respond to only one of the eight "bits" of the repeating code of the interrogator signal. During the 'active' period of this module, (40 millisecs in every 320 milliseconds), the module 6 derives power by rectifying the square wave reference signals with respect to the zero reference and closes a static switch 7 to connect a push-button module 8 to a control link 9. The module 8 is associated with a pair of push buttons and the module 8 also receives the reference levels and interrogator signal and utilises them as a power source to generate a signal which may have one of three conditions during the 40 millisecond 'active' period of the static switch. These three signal conditions represent:

Start push-button pressed — alternating pulses
Stop push-button pressed — no output signal
Neither push-button pressed — unidirectional pulses.

The contactor control unit 3 receives the signals on the cores 4, 5 connected to a module 10 keyed to match the corresponding push-button decoder module 6 and respond to the same 40 millisecond "bit" in the interrogator signal. In this way a static switch 11 on the contactor control unit is synchronised to close for the same short period of time as the static switch 7. When the static switches are closed the three condition signal from the push-button module 8 is fed along the control signal link to a contactor control module 12. The contactor control module examines the signal condition supplied to it and responds with an output into a solenoid operated contactor 13 as follows:

Signal condition — alternating pulses, i.e. start push-button pressed, energise contactor coil and retain energised.

Signal condition — no input signal received, i.e. stop push-button pressed, de-energise contactor coil.

Signal condition — unidirectional pulses — maintain status quo.

The contactor contacts connect the load in the form of a motor 14 to a power supply in the normal way.

The system can also provide thermistor overload protection for each load by fitting an overload detection module 15 in the push-button unit working in conjunction with a negative temperature coefficient (NTC) thermistor. With suitable modifications the arrangement would work with positive temperature coefficient (PTC) thermistors. This module is designed to monitor the resistance of thermistors (negative temperature coefficient resistors) fitted in the load and if the resistance decreases below a preset limit, indicative of overheating, to produce a signal into the push-button unit which will generate the same condition as when the 'STOP' push-button is pressed, to de-energise the load and prevent damage to the load.

The above functional description covers the operation of one pair of push-button and contactor units only. When a plurality of loads are controlled, each load has a push-button switching unit and a contactor control unit which are connected to the cores 4, 5 and 9, and the decoder module of each switching unit is keyed to respond to a different "bit" of the repeating code in the interrogator signal. Thus, eight pairs of units can share the same signal core in the control cable, and a further eight loads may be controlled by adding another control signal core to the cable. The four cores carrying the reference level signals and interrogator signal are common to all units so that the system may be built up with a multicore control cable as follows:

| | |
|---|---|
| 3 reference cores<br>1 interrogator core<br>1 signal core | 5 cores total - control 8 loads |
| + 2nd signal core | 6 cores total - control 16 loads |
| + 3rd signal core | 7 cores total - control 24 loads |
| Up to 13 signal cores | 17 cores total - control 104 loads. |

The small modules which make up the push-button unit are encapsulated and mounted on printed circuit card(s) suitable for locating in a standard type Start/Stop push-button enclosure. The card(s) may be plug and socket connected or conventionally terminated.

A printed circuit card containing the three encapsulated modules and two miniature relays which form the contactor control unit is suitable for mounting in the starter cubicle of the load being controlled. A socket, mounted adjacent to this card, provides the facility of plugging in the push-button unit for check testing of compatible operation of units for maintenance.

Because of the relatively slow pulse system and the voltage level of interrogater and control signals used, no special screening is necessary for the cabling therefore standard cable with normal protection for the environmental conditions may be used.

Referring now to FIG. 2, the drive unit 1 comprises a Schmitt trigger 21 to which a mains frequency signal is applied. The trigger squares the wave form so that a mains frequency squared pulse is fed into a "divide by 16" counter 22. This counter consists of four flip-flops 23 to 26 hence making it possible to divide by 2, divide by 4, divide by 8 and divide by 16. The output from the flip-flop 24 as well as being fed to the flip-flop 25 is fed through two stages 27 which act as buffers and each invert the output signal, to a power amplifier 28 and then to two tappings on the winding of an auto transformer 29. The two output signals from the amplifier 28 are an amplified signal and an amplified and inverted signal respectively of the input to the amplifier. The auto transformer is wound to provide a zero reference on the line 30 and in-phase signals at three different reference levels on the lines 31, 32 and 33 respectively. Similarly three out-of-phase signals at the same voltage levels are provided on the lines 34, 35 and 36 respectively. The signals on the lines 30, 35 and 32 serve as reference signals and those on the lines 33, 31, 34 and 36 serve as input signals to four switches 37, 38, 39 and 40 respectively. Each of these switches receives a mains frequency squared clock pulse taken from the Schmitt trigger 21 and passed through an inverter 41. The switches 37 and 38 each receive an eighth frequency signal from the flip-flop 25 and the switches 39 and 40 also receive an eighth frequency signal from this flip-flop but the signals received by these two switches are inverted with respect to the signals received by switches 37 and 38. Similarly switches 37 and 39 receive sixteenth frequency signals from the flip-flop 26 and the switches 38 and 40 receive these signals from the flip-flop 26 but these signals are inverted with respect to those received by the switches 37 and 39. Switches 37 and 40 are so arranged that they are closed if they only receive a clock frequency pulse and there are no other signals supplied to the switch. When however any other combination of signals is applied to the switch the switches are open when the clock pulses are received. The outputs from the switches are connected together on the line 42 and the interrogator signal is developed on this line.

Figure 3:
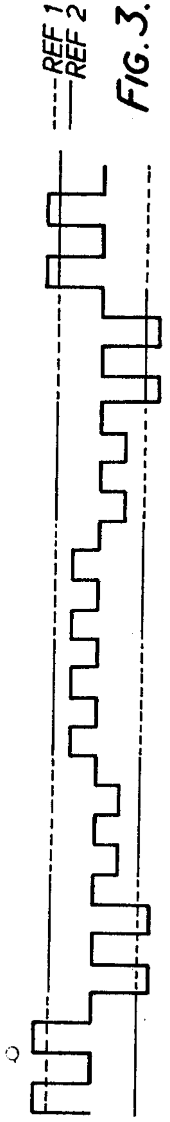

The wave form of an interrogator signal on the line 42 and reference signals on the lines 32 and 35 are shown in FIG. 3. It can be seen that the interrogator signal is of constant frequency and of square waved form and it is divided into eight bits, which with the reference signals, make up eight different combinations.

SUMMARY OF SYSTEM CAPABILITY

The following facilities can be provided by the system:

ON/OFF control from local/remote position.

START/STOP control from local/remote position.

START/STOP/REVERSE control from remote position.

INCHING FORWARD/REVERSE control from remote position.

THERMISTOR OVERTEMPERATURE detection tripping from remote position.

THERMISTOR OVERTEMPERATURE detection alarm from remote position.

OPERATION VIA INTRINSICALLY SAFE BARRIER UNITS FOR USE IN DIV.I and/or DIV.II AREAS.

RELIABILITY FEATURES OF THE INVENTION

The utilisation of very low frequencies in the control signals at voltage levels in the order of tens of volts gives a very high degree of immunity to interference from such sources as motors, contactors, plant welding etc. The system has in fact been subjected to rigorous interference tests without malfunction.

The electronic modules are completely static in function, encapsulated for protection from mechanical damage, damp and heat and suitable in construction for industrial environments.

The system is designed to Fail Safe i.e.— failure of the drive unit to provide reference or interrogator signals will de-energise the contactors feeding the loads. Short circuits or open circuits on control cabling will have the same effect, as loss of signal will de-energise contactors. Short circuits on the cable will not damage the electronic units which have self current limiting protection.

The electronic circuitry has been designed such that failure of individual components will give action of the system to a safe condition for the load or drive concerned, i.e. the drive will either stop or be prevented from starting.

If desired the common control cable to push-button stations can be run as a ring main with spurs to drives at outlying points, whereby if damage occurs to the cable at one position between stations, that section can be isolated for repair or replacement, leaving the system to operate as two radial sections.

We claim:

1. An electrical control system for controlling a plurality of electrical loads each having a contactor in the electrical supply circuit thereto, said system comprising for each load a switch unit including means for producing electrical signals representative of the condition of the switch unit, a contactor control unit connected so as to control the operation of the contactor in the supply circuit to the load in response to signals received from the switch unit, and an electrical signal generating unit for producing output signals including a fixed frequency coded electrical interrogator signal, said last mentioned signals being supplied to the units of all the loads, and an electrical link conductor to which all of the units are connectable, the two units associated with each load being responsive to the same part of the period of the interrogator signal to connect the units to the electrical link conductor and during said part of the period the units of the other loads are non-responsive thereto and said units are not connected to the link conductor.

2. An electrical control system as claimed in claim 1 in which each switch unit comprises a push button unit and a push button module, the module being connected to produce said signals representative of the condition of the push button unit.

3. An electrical control system as claimed in claim 2 wherein each switch unit comprises in addition a static switch in a circuit connecting the push button module with the electrical link conductor, and a decoder module arranged to receive the signals from the generating unit, said decoder module being arranged to close the switch to connect the push button module with the link conductor for said part of the period of the interrogator signal.

4. An electrical control system as claimed in claim 3 wherein the push button unit comprises a pair of push buttons associated with a pair of normally open contacts and a pair of normally closed contacts respectively and wherein the push button module produces a signal indicative of whether one or other or neither of the push buttons has been actuated.

5. An electrical control system as claimed in claim 3 in which each contactor control unit comprises a static switch, a contactor control module and a decoder module arranged to receive the signals from the signal generating unit, said decoder module serving to close the switch to connect the contactor control module to the link conductor for the same part of each period of the interrogator signal as the static switch of the switch unit is closed.

6. An electrical control system as claimed in claim 4 wherein at least one load is provided with temperature overload sensors which are arranged, when the maximum permissible temperature is reached, to supply a signal to the push button module corresponding to the signal received by the module when the push button associated with the pair of normally closed contacts is actuated.

7. An electrical control system as claimed in claim 2 in which each module is static in function and is encapsulated for protection purposes.

8. An electrical control system as claimed in claim 1 wherein the signal generating unit produces three electrical signals at different reference levels, the levels being a zero reference and a positive and a negative signal of the same amplitude with respect to the zero reference.

9. An electrical control system as claimed in claim 8 in which the signal generating unit includes a Schmitt trigger energisable at mains frequency with its output connected to a four stage frequency divider unit, with the output frequency of each stage being half its input frequency.

10. An electrical control system as claimed in claim 9 in which the output of the second stage of the divider unit, is amplified and amplified and inverted respectively and these signals constitute the positive and negative signals with respect to the zero reference.

11. An electrical control system as claimed in claim 10 in which the reference signals are supplied to a pair of tappins on an auto transformer which are electrically symmetrical about the zero reference and outputs from the transformer at different levels are supplied to respective switching devices which are rendered conductive in turn to produce the coded interrogator signal.

* * * * *

UNITED STATES PATENT OFFICE
CERTIFICATE OF CORRECTION

Patent No. 4,020,359 Dated April 26, 1977

Inventor(s) Walter Tate and Thomas Robertson

It is certified that error appears in the above-identified patent and that said Letters Patent are hereby corrected as shown below:

Column 4, line 35 -- the word "and" between 37 and 40 should read --to--.

Column 4, line 57 -- "START" should read --FORWARD--.

Column 6, line 54 -- the "g" in tappings has been omitted.

Signed and Sealed this

*Twenty-ninth* Day of *November 1977*

[SEAL]

*Attest:*

RUTH C. MASON
*Attesting Officer*

LUTRELLE F. PARKER
*Acting Commissioner of Patents and Trademarks*